No. 829,975. PATENTED SEPT. 4, 1906.
J. C. LINCOLN.
VARIABLE SPEED ELECTRIC MOTOR.
APPLICATION FILED JUNE 27, 1905.
2 SHEETS—SHEET 1.
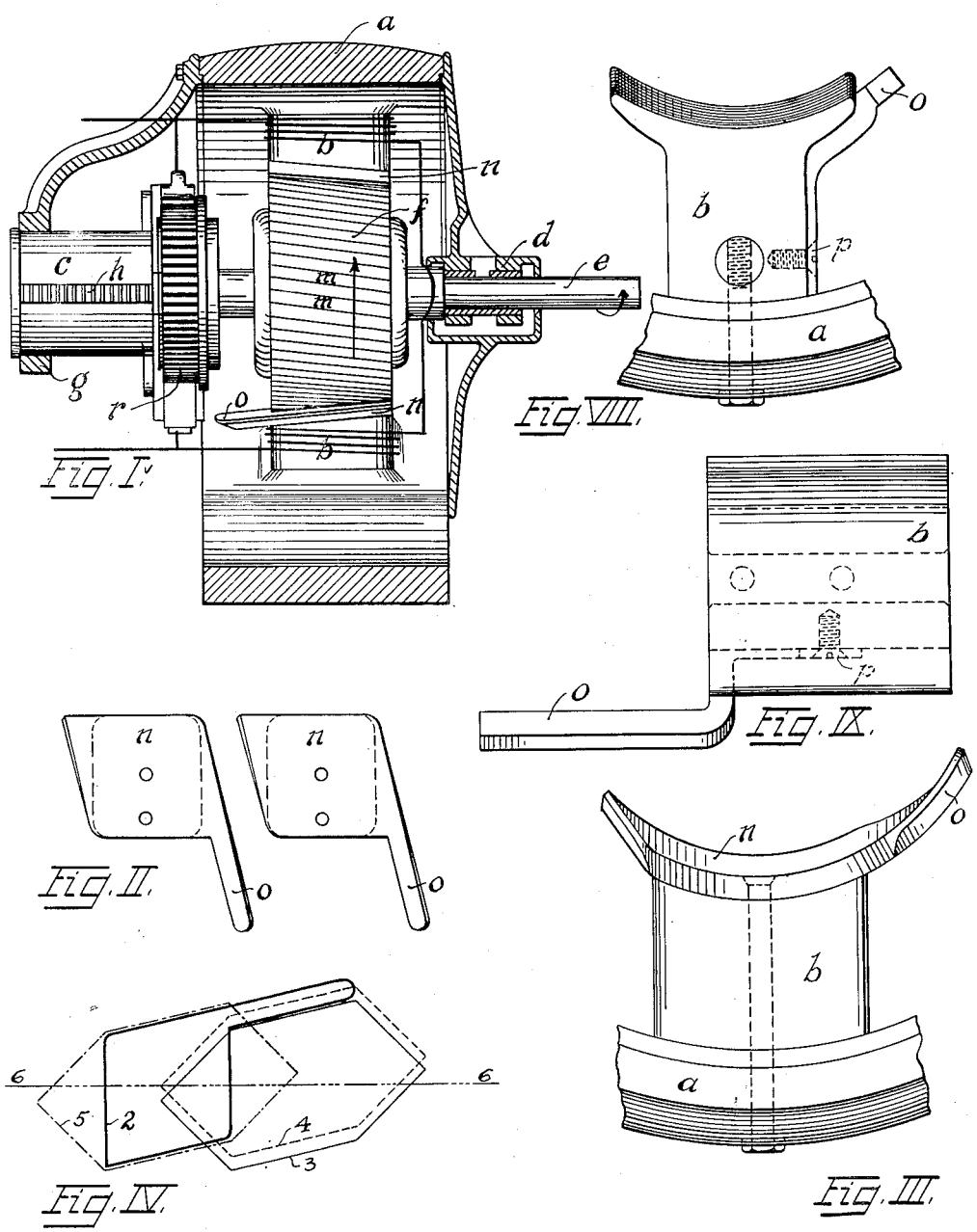
Witnesses:
F. C. Valentine
M. A. Driscoll
Inventor,
John C. Lincoln
By his attorney.

No. 829,975. PATENTED SEPT. 4, 1906.
J. C. LINCOLN.
VARIABLE SPEED ELECTRIC MOTOR.
APPLICATION FILED JUNE 27, 1905.
2 SHEETS—SHEET 2.
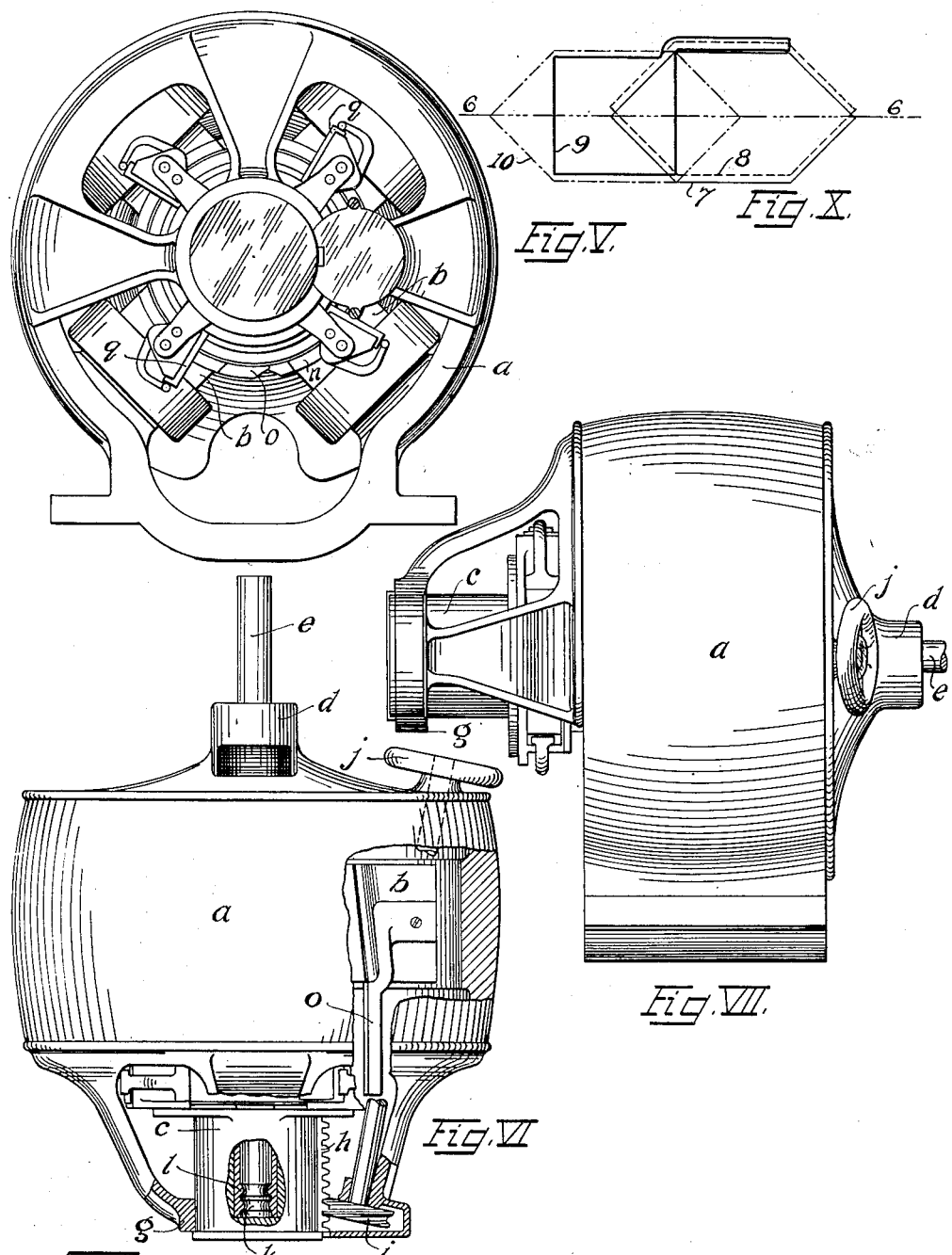
Witnesses:
F. C. Valentine
M. A. Driscoll
Inventor,
John C. Lincoln
by Herbert _____ Lawrence,
his attorney.

UNITED STATES PATENT OFFICE.

JOHN C. LINCOLN, OF CLEVELAND, OHIO, ASSIGNOR TO THE LINCOLN COMPANY, OF CLEVELAND, OHIO, A CORPORATION OF OHIO.

VARIABLE-SPEED ELECTRIC MOTOR.

No. 829,975.        Specification of Letters Patent.        Patented Sept. 4, 1906.

Application filed June 27, 1905. Serial No. 267,214.

*To all whom it may concern:*

Be it known that I, JOHN C. LINCOLN, a citizen of the United States of America, and a resident of Cleveland, in the county of Cuyahoga and State of Ohio, have invented certain new and useful Improvements in Variable-Speed Electric Motors, of which the following is a specification.

My invention relates to improvements in variable-speed electric motors, and is herein particularly described as applied to the type of motor having field and armature windings associated in shunt relation and provided with means for securing the lateral or axial movement of the armature with respect to the field structure of the motor, whereby variation in speed is attained.

The object of my invention has been to so construct motors of this class as to secure an unusual range in the speed variation thereof and to avoid undue or harmful sparking at the brushes of the motor and particularly at high speeds. It has been my purpose to accomplish these results by the simplest practicable means and without the reduction of efficiency in the motor as modified by my improvements. Such motors, I may say, find a wide range of employment, as upon lathes, machine-tools, printing-presses, electric launches, mechanical cranes, and the like, the demands being varied in the requirement as to speed variation, ranging from one to three and as high as one to six. My improvements secure not only such extreme speed variations as the above, but attain even wider ranges and any intermediate speeds as well. My said improvements will be clearly recited in the appended claims, the structure herein described, whereon they are based, comprising an electromotor preferably of shunt-wound type and having a frustoconical armature equipped with means for securing its longitudinal withdrawal from the field structure of said motor, whereby the armature speed is varied.

Associated with the field structure are narrow polar extensions lying in the direction of withdrawal of the armature and suitably displaced or advanced with respect to their corresponding poles of the motor as to cause the generation of an electromotive force successively in the coils of the armature at the moment of commutation in opposition to the armature-current, whereby sparking at the brushes during high speeds is avoided. Moreover, I may, in conjunction therewith, provide the armature with windings peculiarly positioned thereon or biased to secure an effect in the operation of the motor comparable to the well-known results obtained by rocking the brushes forward and back to suit the varying operative conditions.

My improvements accordingly are seen to relate essentially to the construction of a motor compact and of relatively small size, extreme simplicity, and one having a wide range of speed under commercial conditions and the production therein of what I may term a "special commutating-field," effective when the motor is operated at high speeds. Various details which I shall describe in the following specification have no necessary relation to the essential features of my improvements, which are set forth in the appended claims.

These features will be more readily appreciated by making reference to the accompanying drawings, illustrating by diagram and in detail embodiments of my invention, wherein—

Figure I is a vertical sectional view through a variable-speed electric motor constructed in accordance with my invention. Fig. II shows plan views of two of the biased wrought-iron polar faces attached, respectively, to the fields of the motor and positioned to indicate as developed upon a plane their relation in the motor. Fig. III is a detail in side elevation showing a portion of the field structure and one of the poles with its polar face or extension secured thereto. Fig. IV is a diagram intended to illustrate the mode of operation of my improved biased motor-winding and field structure. Figs. V and VII, respectively, are end and side elevations of the said motor. Fig. VI is a plan view illustrating the motor and details of the preferred means for securing the lateral movement of the armature. Fig. VIII is a detail in side elevation showing one of the poles of the field structure equipped with a straight or unbiased polar extension. Fig. IX is a plan view of the same, and Fig. X is a diagram designed to illustrate the theory of operation of the motor as equipped with the unbiased form of polar extensions.

Throughout the several figures of the drawings I have employed the same character of reference to indicate similar parts in order to avoid any confusion.

In many of its features the motor herein disclosed conforms to the commercial shunt-wound motor. The field structure, including the motor-frame, is stationary and rigid, while variation in speed is attained, as previously stated, by causing the armature and its associated parts to move axially out of the field, thereby lengthening the air-gap and decreasing its area, as will be well understood by those skilled in the art.

Referring particularly to the figures of the drawings showing the motor, it will be seen that the field-casting $a$ is equipped with four interiorly-extending laminated pole-pieces $b$, of which the bases are embraced and cast within or bolted to said field-casting. At the left is an enlarged thrust-bearing $c$, and at the right an ordinary bearing $d$, respectively carried by arms or standards at the sides of the motor and which together support the shaft $e$ of the armature $f$ in a manner to permit its longitudinal withdrawal from the field structure, as above indicated. For this purpose the shaft $e$ slides laterally to the left in the right-hand bearing $d$, while the thrust-bearing $c$ is longitudinally movable in the annular support $g$, formed integral with the supporting arms or standards at the left of the motor. A rack $h$ upon the thrust-bearing serves as a feather to prevent the rotation of said bearing and engages a worm-wheel $i$, serving to actuate said bearing and move the armature and its associated parts axially within the field structure, this being manually controlled by the hand-wheel $j$. The portion of shaft $e$ within the thrust-bearing is provided with annular depressions $k$, which are engaged by the collars $l$ of Babbitt metal within the bearing and withstand the lateral stress placed upon the shaft.

Extending laterally to the left from each of the field-poles of the motor is a narrow polar extension $o$, which is somewhat in advance of the corresponding pole with which it is connected, it being understood that the armature rotates in a contra-clockwise direction, as viewed in Fig. V. These in the commercial type of motor may conveniently be constructed of the bent arms $o$, (shown in Figs. VIII and IX,) which are secured to the magnetic body of the field structure, as by a screw or bolt $p$, and extend practically the entire distance which the armature is capable of being withdrawn from the field structure, so as to embrace said armature over restricted areas even in its position for operating at high speeds. The armature employed with this type of polar extension, I may say, is wound after the well-known manner, the coils thereof lying in grooves extending straight across the face of its magnetic body, and consequently parallel with the polar extensions. These polar extensions are so positioned as to subject the coils or windings in turn to a commutating field during the moments of commutation or short-circuiting of the coils by the brushes $q$, which are mounted upon the thrust-bearing to move with the armature $f$ and commutator $r$. Certain theoretical considerations may make it desirable to modify this construction in a further particular, which I shall now describe, although the commercial form of my improved motor, already explained and described, will, I believe, be found entirely satisfactory for ordinary requirements and is simpler and cheaper to construct.

In the motor shown in Figs. I and II it will be observed that the iron body of the armature $f$ is provided with parallel series of diagonal grooves $m$, wherein the armature-windings are disposed. Coacting therewith are the biased polar faces $n$ of wrought-iron which are securely bolted to the laminated pole-pieces $b$ and the field-casting $a$, the said polar faces $n$ having diagonal extensions $c$ to the left or in the direction of withdrawal of the armature. By means of this construction the magnetic field is normally or at low speed caused to coincide substantially with the biased armature-windings being commutated, which are disposed in the diagonal slots of the armature, while at high speeds restricted areas of said armature are subjected to the influence of the field through the media of the lateral polar extensions $c$ and subserving purposes which will later appear. As stated, the armature $f$ preferably is of frusto-conical form, although my invention is not restricted to such contour, but contemplates other types of armature as well. In the structure shown the interior armature-receiving space is likewise made of frusto-conical form, closely conforming to the armature, the minor base of such space being upon the side of the motor opposite the adjustable bearing $c$, the said armature and field structure, or rather the polar faces thereof, presenting corresponding parallel surfaces of frusto-conical contour.

Assuming that with the several parts of the motor operating in the position shown in the drawings it is desired to increase the speed of the motor under the influence of a given constant current passing through the field-windings, it is necessary merely to actuate the hand-wheel $j$, which through the medium of the worm and rack will serve to move to the left the adjustable bearing and associated movable parts, including the armature, thus immediately increasing the reluctance of the air-gap between the armature and field, and consequently decreasing the magnetic flux entering the armature.

Since the counter electromotive force of an armature is proportional to the product of the speed and the magnetic flux and such product is practically constant for a given primary electromotive force, such decrease in the magnetic flux must be accompanied by an increase in speed, which necessarily takes place. The withdrawal of the armature from the magnetic field reduces the area of the air-gap, and thus effects an increase in the reluctance thereof. This is true whether or not the interior armature-receiving space and coacting armature be of ordinary cylindrical form; but by employing the frusto-conical construction for the armature and fields as described not only is the area of the air-gap decreased, but the length thereof is simultaneously increased with the withdrawal of the armature, thus further adding to the magnetic reluctance. Accordingly in the preferred or frusto-conical construction the increase of reluctance is obtained in two ways—first, by decreasing the area of the air-gap, and, second, by increasing its length, so that with a given axial movement of the armature a greater variation in the speed thereof is obtained than would be the case were the construction cylindrical instead of frusto-conical. I may again point out, however, that my invention is not restricted to the use of this preferred type of construction. Since, however, the entire width of the armature is subjected over restricted and definite areas to the magnetic fields, the maximum theoretical variation in speed is not attained by the construction shown, which, however, presents advantages so distinctly its own as to be preferred to any other with which I am acquainted. This feature of my invention I can best explain by making reference to Fig. IV of the drawings. Therein I have endeavored to set forth diagrammatically the principal advantage obtained by the peculiar configuration of the pole-faces and polar extensions and the biased or diagonal positioning of the windings upon the armature. In the said diagram the inner figure 2 in heavy lines will be recognized by its shape as depicting one of the polar faces with its extension, or better, said figure or outline may be taken to represent the magnetic field produced by said polar face and extension. The partially-superposed figures 3 and 4 respectively represent a given armature-coil at the commencement and close of its short circuit beneath the brushes of the armature during the conditions obtaining under high speed, while figure 5, formed of dots and dashes, illustrates the corresponding position of the armature-coil under normal conditions or low speed. Line 6 may be taken to represent the axis of the armature.

Referring to Fig. X, a similar condition has been diagrammatically illustrated with regard to the type of motor equipped with straight polar extensions and parallel unbiased armature-windings present in what I may term the "more common" or "commercial" type of my motor. As before the partially-superposed figures 7 and 8 respectively represent a given armature-coil at the commencement and close of commutation under high-speed conditions, the figure 9 indicating any given pole and polar extension or the configuration of the magnetic field produced thereby, while figure 10, formed of dots and dashes, illustrates the low-speed position of the same armature-coil. Line 6 herein also represents the axis of the armature. Accordingly it will be appreciated that each armature-coil in turn is subjected to the extended commutating magnetic field throughout the entire width of the armature during high-speed conditions. This, however, occurs only during the brief interval in which the coils are short-circuited by the brushes, and consequently serves to generate in the respective coils an electromotive force in opposition to the current previously flowing in said coils, and thereby neutralizing or overcoming the tendency to spark at the brushes.

With the foregoing in mind it is very readily perceived that the actuation of the armature axially from its normal or low-speed position serves the same function with the biased construction, Fig. IV, as is obtained by bodily rocking back the brushes upon the commutator, commonly resorted to in order to prevent sparking. This effect is obtained by reason of the fact that while the armature is moved in a right line the magnetic field and the windings upon said armature are displaced or biased, so that at low speeds the field and coil being commutated are in approximate coincidence during such commutation. This is secured by a rearward as well as a lateral displacement of the said armature-winding with respect to the field upon actuating the armature axially out of said field, as above described. In the machine itself I may note that while commutation at low speeds approximately takes place midway between the poles of said machine at high speeds the point of commutation is made to approach nearer to the poles from which the coil is receding. This operation will be more readily appreciated by making reference to the diagram of Fig. IV, wherein it is seen that in the high-speed positions 3 4 the armature-winding is not so far advanced with respect to the field 2 as it is in the low-speed position 5, and this necessarily results from the lateral movement of the armature-coil. In addition to the above the action of the biased polar extensions accomplish another and highly useful function—viz., that of assisting in reducing or minimizing the sparking at the brushes during high speeds. Thus it will be seen that although a large portion of the armature-winding at high speeds will be removed from the armature-space, thereby greatly reducing the area of the air-gap, still the restricted areas of the field represented by the polar extensions subject all of the effective portions of the armature-coils to a magnetic flux during the period of commutation. In consequence a greater electromotive force is thus set up in said coils than is obtainable without using polar extensions, and which in theory should exactly reverse the flow of the armature-current in the coil, and thus prevent sparking. Accordingly in passing from the full-line to the dotted-line positions of the diagram the armature-coil 5 6 will be subjected to the field of the polar extension 2 and reversed current will be generated therein after the manner pointed out.

In the foregoing I have endeavored to set forth briefly my understanding of the manner in which my improved motor operates, and I may now refer to a few structural details.

By the means adopted for securing the variation in speed and for limiting or avoiding sparking at high speeds present in my improved motor and residing in mechanism for laterally withdrawing the armature from the field structure and in the polar extensions beneath which the armature is rotated during its positions of withdrawal I am enabled to reduce the size of the variable-speed motor for a given horse-power very materially as compared with any other structure with which I am acquainted, as I believe the best results are secured in my improved construction when the field-windings and magnetic bodies of the polar extensions are so constructed and proportioned as to secure the substantial magnetic saturation of said extensions at full load and high speed. Moreover, this construction admits of a greatly-increased number of turns or windings upon the armature as compared with a motor wherein the polar extensions are absent or in a motor in which change in speed is obtained by altering the strength of the magnetic field, and the decrease in flux thereby obtained demands a correspondingly smaller section of iron in the field structure in order to carry the necessary magnetic lines. In consequence I am enabled to manufacture a motor along the lines herein set forth having as wide a range of speed as one to six, while reducing the weight of the motor more than half as compared with other commercial structures.

In order to obtain a proper commutating field under the polar extensions at full load and high speeds, it is important to make the field ampere-turns enough greater than the armature ampere-turns, so that the net ampere-turns, which is the difference between these two quantities, is still sufficient to saturate the polar extensions at high speed.

With respect to the type of motor with biased or diagonally-positioned armature-windings and polar faces and extensions I may say that I have made the bias of the armature-slots equal to approximately one and one-quarter times the width of the armature-teeth, while the bias of the polar field secured by the configuration of the polar plates obviously will correspond thereto. In other words, the windings disposed in the slots of the armature lie parallel with the lateral lines defining the polar surfaces of the field structure and extensions of said poles.

In order more sharply to define the magnetic fields, and particularly such portions as are produced by the lateral polar extensions, I may cut away or bevel the exterior edges of such extensions or the wrought-iron face-plates, as best shown in Figs. I and III, in order to reduce the magnetic body in these positions and limit or control the flow of the magnetic lines of force.

It should be pointed out with respect to the simple diagrams offered in explanation of my understanding of the operation of my improved motor that said diagrams are merely intended to represent in a general way the function or mode of operation of my improvements and are not offered as mathematical or scientifically-exact presentations of the subject-matter. Indeed, the latter would require an involved and complicated series of diagrams both for structural and theoretical reasons.

As I have heretofore indicated, I do not deem that my invention is in any way restricted to many of the structural details herein set forth in explanation of the preferred type of motor as I now construct it, since my improvements relate neither to the particular configuration or structure of the armature and field portion of the motor as set forth in detail, but rather in the described employment of my invention to the application to an electric motor of suitable means for providing a commutating field during high-speed conditions of the motor, which improvements, moreover, may be generally applied to dynamo-electric machinery of any suitable type.

Accordingly I claim as new, and desire to secure by these Letters Patent, the following:

1. In a variable-speed electric motor, the combination with its field structure, of an armature normally positioned therein, means for effecting the lateral or axial adjustment of the armature with respect to the field, and lateral polar extensions associated with the field structure so positioned as to subject restricted areas of the armature to the influence of the field in its laterally-adjusted positions, substantially as set forth.

2. In a variable-speed electric motor, the combination with its field structure, of an armature normally positioned therein, the windings upon said armature being diagonally positioned or biased with respect to the axis of rotation, means for effecting the lateral or axial adjustment of the armature with respect to the field, and lateral polar extensions associated with the field structure so positioned as to subject restricted areas of the armature to the influence of the field in its laterally-adjusted positions, substantially as set forth.

3. In an electric motor, the combination with a field structure having biased polar faces, of an armature mounted to rotate therein and having correspondingly biased or diagonally-positioned windings, and means for securing the partial withdrawal of the armature from the field in the line of its axis, substantially as set forth.

4. In a variable-speed constant-potential electric motor, the combination with its field structure, of biased polar faces and narrow polar extensions associated therewith, an armature mounted normally to rotate within the field structure, and means for partially withdrawing said armature axially from the field structure, substantially as set forth.

5. In a variable-speed constant-potential electric motor, the combination with its field structure, of biased polar faces and narrow polar extensions associated therewith, an armature mounted normally to rotate within the field structure; the windings of the armature being biased or diagonally positioned to correspond with the polar faces, and means for partially withdrawing said armature axially from the field structure, substantially as set forth.

6. In an electric motor, the combination with a field structure having narrow lateral polar extensions, of an armature mounted normally to rotate within the field structure; the opposing faces of the field structure and armature being of frusto-conical contour, and means for effecting the lateral or axial adjustment of the armature with respect to said field structure, substantially as set forth.

7. The combination in a variable-speed electric motor, with its field structure having biased polar extensions, of an armature mounted normally to rotate within the field structure having its windings correspondingly biased thereon, and suitable means for securing the axial adjustment of the armature in the direction of the polar extensions, substantially as set forth.

8. The combination in a variable-speed electric motor, with its field structure having biased polar extensions, of an armature mounted normally to rotate within the field structure having its windings correspondingly biased thereon; the opposing or conforming surfaces of the armature and field structure being made of frusto-conical form, and suitable means for securing the axial adjustment of the armature in the direction of the polar extensions, substantially as set forth.

9. In an electric motor, the combination with its field structure, of an armature rotatably mounted within the field structure, and opposing polar faces having lateral extensions, provided upon the field structure and cut away along their outer edges more sharply to define or position the magnetic fields, substantially as set forth.

10. In a variable-speed electric motor, the combination with the field structure thereof, of an armature normally rotating within said field structure, suitable mechanism for effecting the lateral withdrawal of said armature from the field structure into positions of adjustment for increasing the speed of rotation, and means for creating a commutating field for the armature in its positions of withdrawal from the said field structure, substantially as set forth.

11. In a variable-speed electric motor of the general class described, the combination with its field structure, of an armature mounted normally to rotate therein, means for effecting the partial withdrawal of the armature axially from its field structure to increase its speed of rotation, and additional means for creating a commutating magnetic field for the armature in its high-speed positions, substantially as set forth.

12. In an electric motor of the class described, the combination with its field structure, of an armature mounted normally to rotate therein; the windings thereof being biased or diagonally positioned, biased polar extensions provided upon the field structure, a sliding thrust-bearing upon the armature-shaft, and a rack-and-screw adjustment for securing the lateral or axial movement of the armature in the direction of the polar extensions, substantially as set forth.

13. In a dynamo-electric machine, the combination with its field structure, of a laterally-positioned magnetic body beyond the fields, means for exciting the same magnetically, an armature mounted normally to rotate beneath the fields, and suitable mechanism for effecting the relative lateral movement of the armature and field structure to increase the speed of rotation, and simultaneously subject the armature to the excited magnetic body to insure a commutating field, substantially as set forth.

14. In a dynamo-electric machine of the class described, the combination with its multipolar field structure, of laterally-extending polar extensions associated with the poles of the field structure and beyond the exciting-windings thereof an armature mounted to rotate within the field structure, and suitable means for securing the relative adjustment of the armature and field structure, whereby the said armature may be subjected to the influence of the polar extensions, substantially as set forth.

15. In a variable-speed electric motor of the class described, the combination with its field structure, of lateral polar extensions provided thereon and affording commutating fields, an armature normally rotating within the field structure, and suitable mechanism for partially withdrawing the armature from the field structure into positions of adjustment beneath the commutating fields, substantially as set forth.

16. In a variable-speed electric motor of the class described, the combination with its field structure, of lateral polar extensions provided thereon and affording commutating fields, an armature normally rotating within the field structure; the windings upon the armature being substantially parallel with the lines of the polar extensions, and suitable mechanism for partially withdrawing the armature from the field structure into positions of adjustment beneath the commutating fields, substantially as set forth.

17. In a variable-speed electric motor, the combination with a multipolar field structure, of polar extensions associated therewith, an armature mounted to rotate normally within the field structure; the opposing or conforming surfaces of the armature and field structure being of frusto-conical contour, and suitable mechanism for securing the adjustment of the armature laterally beneath the polar extensions, substantially as set forth.

18. In a variable-speed electric motor of the class described, the combination with its field structure, of lateral polar extensions provided thereon, an armature rotatably mounted within the field structure; the windings upon the armature and the polar extensions being substantially parallel, and means for effecting the lateral or axial adjustment of said armature with respect to the field structure, whereby the armature is subjected to the influence of restricted commutating fields, substantially as set forth.

19. In a dynamo-electric machine, the combination with a field structure having a plurality of interiorly-extending pole-pieces, of narrow lateral polar extensions attached to said pole-pieces, an armature mounted to rotate within the magnetic fields thereby generated and means for effecting the relative lateral movement of the armature and field structure, substantially as set forth.

20. In a dynamo-electric machine, the combination with a field structure having a plurality of laminated pole-pieces, of polar extensions formed of magnetic material, preferably of wrought-iron, associated with each of the pole-pieces beyond the exciting-windings thereof, an armature rotatably mounted within the field structure, and means for laterally adjusting it beneath the polar extensions, substantially as set forth.

21. In a dynamo-electric machine, the combination with its field structure having laminated pole-pieces, of laterally-extending portions or polar faces of wrought-iron secured to the laminated pole-pieces, the same being laterally cut away to secure a narrow cross-section, an armature positioned normally to rotate beneath the fields of the machine, and means for effecting the relative adjustment of the armature and field structure, whereby the former is subjected to commutating fields over restricted portions or areas in its positions of lateral adjustment, substantially as set forth.

22. In a dynamo-electric machine, the combination with its field structure, of lateral polar extensions associated with the poles thereof; the same being positioned beyond the exciting-windings of the field-poles and forwardly displaced in the direction of rotation of the armature, said armature mounted to rotate normally within the field structure, and suitable means for securing the relative adjustment of the armature and field structure, substantially as set forth.

23. In a variable-speed electric motor, the combination with its field structure, of lateral polar extensions associated therewith, an armature normally positioned within the field structure; the opposing or conforming surfaces of the armature and field structure being of frusto-conical contour, and means for securing the relative adjustment of the armature and field structure, whereby the said armature is brought under the influence of the polar extensions, substantially as set forth.

24. In a variable-speed electric motor of the class described, the combination with a field structure having a plurality of poles, narrow lateral, and forwardly-displaced polar extensions associated with said poles, positioned beyond the exciting-windings thereof, whereby the effective magnetic field is laterally extended to include the several armature-windings during the moment of commutation, an armature mounted to rotate within the field structure, and suitable adjusting mechanism associated with the armature for laterally actuating it interiorly of the polar extensions, substantially as set forth.

25. In a variable-speed electric motor, the combination with the field structure thereof, of an armature normally positioned to rotate therein, and screw-adjusting mechanism positioned at an angle with the axis of the armature and adapted to secure the relative lateral adjustment of the armature and field structure, said mechanism being disposed within said field structure and adjacent to the space occupied by the adjustable armature, substantially as set forth.

Signed at Cleveland, this 7th day of June, A. D. 1905, in the presence of two subscribing witnesses.

JOHN C. LINCOLN.

Witnesses:
C. W. HITCHCOCK,
ALBERT LYNN LAWRENCE.